(12) United States Patent
Lai et al.

(10) Patent No.: US 12,394,812 B2
(45) Date of Patent: Aug. 19, 2025

(54) FUEL CELL STACK RE-COMPRESSION METHOD AND DESIGN

(71) Applicant: GM GLOBAL TECHNOLOGY OPERATIONS LLC, Detroit, MI (US)

(72) Inventors: Yeh-Hung Lai, Oakland, MI (US); Jeffrey A. Rock, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 594 days.

(21) Appl. No.: 17/949,581

(22) Filed: Sep. 21, 2022

(65) Prior Publication Data

US 2024/0097173 A1   Mar. 21, 2024

(51) Int. Cl.
*H01M 8/248* (2016.01)

(52) U.S. Cl.
CPC ........ *H01M 8/248* (2013.01); *H01M 2250/20* (2013.01)

(58) Field of Classification Search
CPC .................................................. H01M 8/248
See application file for complete search history.

(56) References Cited

U.S. PATENT DOCUMENTS

2006/0093890 A1 *  5/2006  Steinbroner ........... H01M 8/248
                                                         429/511

* cited by examiner

*Primary Examiner* — Sarah A. Slifka
(74) *Attorney, Agent, or Firm* — Quinn IP Law

(57) ABSTRACT

A method, fuel cell system and vehicle for maintaining compression via re-compression is provided. By recovering fuel cell stacks of the fuel cell system after a pre-determined time of operation and performing re-compression on each of the recovered fuel cell stacks, power generation capacity, active area pressure and seal force is recovered to address increased contact resistance and loss of fuel cell system power generation capacity as well as decreased seal force and increased risk of reactant gas and coolant leak.

20 Claims, 5 Drawing Sheets

FUEL CELL STACK RE-COMPRESSION METHOD AND DESIGN

INTRODUCTION

The present disclosure is related to fuel cell systems and, more specifically, to re-compression of fuel cell stacks and a fuel cell stack design to accommodate the re-compression.

Fuel cells have been proposed as a clean, efficient, and environmentally responsible power source for electric vehicles and various other applications. One example of a current fuel cell is a Proton Exchange Membrane (PEM) fuel cell that includes a membrane-electrode-assembly (MEA) that includes a thin, solid polymer membrane-electrolyte having a catalyst and an electrode on both faces of the membrane-electrolyte.

The MEA of the current fuel cell includes porous conductive materials, also known as gas diffusion media, which form anode and cathode electrode layers. Fuel, such as hydrogen gas, is introduced at the anode where it reacts electrochemically in the presence of the catalyst to produce electrons and hydrogen cations or photons. The electrons are conducted from the anode to the cathode via an electrical circuit connected therebetween. Simultaneously, the hydrogen cations or photons pass through the electrolyte to the cathode where an oxidant, such as oxygen or air, reacts electrochemically in the presence of the electrolyte and catalyst to produce oxygen anions. The oxygen anions react with the hydrogen cations or photons to form water as a reaction product.

The MEA of a current fuel cell is interposed between a pair of electrically conductive contact elements or separator plates to form a single PEM fuel cell. Separator plates serve as current collectors for the anode and cathode, and have appropriate channels and openings formed therein for distributing the fuel cell's gaseous reactants, such as $H_2$ and $O_2$, over the surfaces of the electrodes.

Current PEM fuel cells are not individually operated, but rather connected in series, or stacked one on top of the other, to form fuel cell stacks (FCSs) with the FCSs loaded in compression to maintain low interfacial electrical contact resistance between the separator plates, the gas diffusion media, and a catalyst electrode.

The low interfacial contact resistance in a current PEM FCS is directly related to the compression loading. A typical compression load on the separator plate may range from about 50 to about 400 psi and is controlled by a compression retention system.

Current compression retention systems are typically designed to effectively offset strains produced by membrane swelling that may occur with changes in humidity and temperature and compressive stress relaxation in the FCS and minimize over-compression and damage of gas diffusion media in the fuel cell stack, as well as maintain the desired stack compression and contact pressure between separator plates, gas diffusion media, and catalyst layers. Stack compression maintains electrical contact and facilitates lower contact resistance between individual fuel cells within the FCS.

However, FCSs may be affected by creep that contributes to increased contact resistance and loss of FCS power generation capacity as well as decreased seal force and increased risk of reactant gas and coolant leak. The present disclosure addresses this issue.

SUMMARY

The present disclosure provides a method, fuel cell system and vehicle including the fuel cell system for maintaining compression via re-compression. The method includes recovering fuel cell stacks of the fuel cell system after a pre-determined time of operation and performing re-compression on each of the recovered fuel cell stacks. The re-compression may include effecting a predetermined decrease in cell pitch or stack length. The re-compression may include performing cell repeat control. The re-compression may include increasing forces in at least the one or more FCSs, an active area of the one or more fuel cells, or a seal force of the one or more fuel cell stacks. The method may include alerting an owner of a vehicle in which the one or more fuel cell stacks is located to an approaching time at which the recovery of the one or more fuel cell stacks is performed. The re-compression may be performed without bringing the one or more fuel cell stacks to a factory that manufactured a vehicle in which the fuel cell system is located.

The fuel cell system includes fuel cells with a plurality of anode headers, a plurality of cathode headers and a plurality of coolant headers around an active area with a plurality of seals between the active area and the plurality of anode headers and the plurality of cathode headers. Each fuel cell is formed of two end plates, a side plate or tension rod between the two end plates and a plurality of cells between the end plates, with each of the plurality of cells including a bipolar plate and a membrane electrode assembly. Bolts are utilized to achieve predetermined compression with bolt holes in the two end plates of each fuel cell to accommodate the bolts with the bolts installed by being driven to a full depth into a corresponding bolt hole in the end plate of each fuel cell.

A spacer may be provided under each of the fixed length bolts. Seven seals may be provided such that two seals are provided for two anode headers, two seals are provided for two coolant headers, two seals are provided for two cathode headers, and one perimeter seal circles the two anode headers, the two cathode headers and the active area. The one perimeter seal may also circle the two coolant headers.

The vehicle includes a vehicle body, wheels connected to the vehicle body; and a fuel cell electric system for powering the wheels where the fuel cell electric system includes the fuel cell system.

The above summary is not intended to represent every embodiment or every aspect of the present disclosure. Rather, the foregoing summary merely provides an exemplification of some of the novel concepts and features set forth herein. The above features and advantages, and other features and advantages, will be readily apparent from the following detailed description of illustrated embodiments and representative modes for carrying out the disclosure when taken in connection with the accompanying drawings and appended claims. Moreover, the present disclosure expressly includes any and all combinations and sub-combinations of the elements and features presented previously and subsequently.

Figure 1:
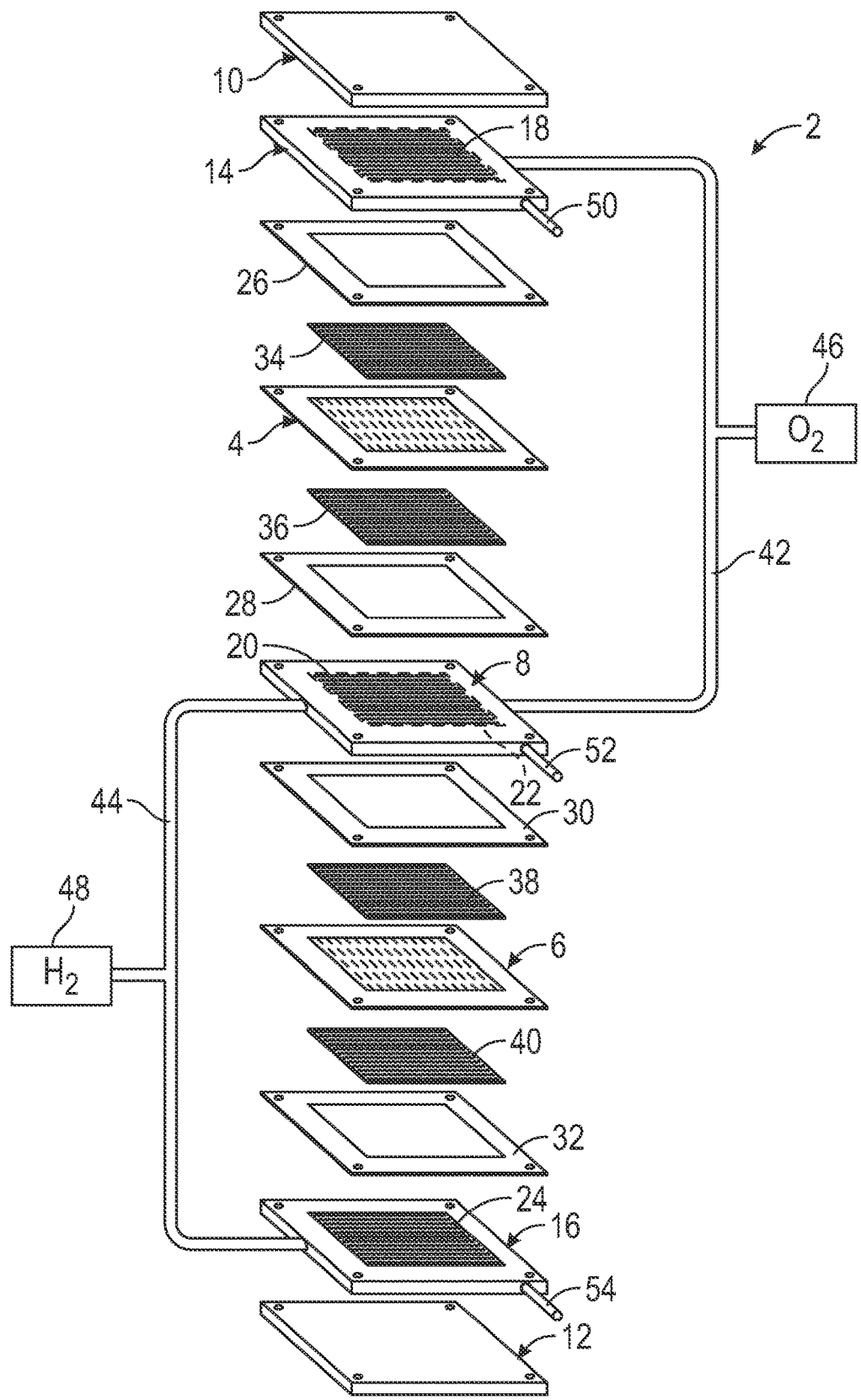
FIG. 1 illustrates a schematic perspective view of a PEM FCS (illustrating two cells) according to a current system.

The present disclosure may be extended to modifications and alternative forms, with representative embodiments illustrated in the drawings and disclosed in detail herein. Inventive aspects of the present disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

The following description is merely exemplary in nature and is not intended to limit the present disclosure, application, or uses. It should also be understood that throughout the drawings, corresponding reference numerals indicate like or corresponding parts and features.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

FIG. 1 illustrates a schematic perspective view of a PEM FCS (illustrating two cells) according to a current system. As illustrated in FIG. 1, the PEM FCS 2 includes a pair of MEAs 4, 6 separated by an electrically conductive fluid distribution element, (hereinafter referred to as a "bipolar or separator plate" (SP) 8). The MEAs 4, 6 and SP 8 are stacked together between end plates (EP) 10, 12 and contact elements (CE) 14, 16. The CEs 14, 16, as well as both working faces of the SP 8, each contain a corresponding plurality of channels, or flow path grooves (FG) 18, 20, 22, 24, for distributing fuel and oxidant gases, such as $H_2$ and $O_2$, to the MEAs 4, 6. Nonconductive gaskets 26, 28, 30, 32 provide seals and electrical insulation between the components of the FCS 2.

The MEAs 4, 6 may include gas permeable conductive materials as electrodes 34, 36, 38, 40, such as carbon/graphite diffusion paper. The electrodes 34, 36, 38, 40 press against MEAs 4, 6. The CE 14 presses against the electrode 34 and the CE 16 presses against the electrode 40. The SP 8 presses against the electrode 36 on the anode face of MEA 4, which is configured to accept a hydrogen-bearing reactant. The SP 8 presses against the electrode 38 on the cathode face of MEA 6, which is configured to accept an oxygen-bearing reactant.

Oxygen is supplied to the cathode side of FCS 2 from a first storage tank (ST) 46 via a first supply conduit (SC) 42, while hydrogen is supplied to the anode side of the FCS 2 from a second storage tank 48, via a second SC 44. Alternatively, ambient air may be supplied to the cathode side of FCS 2 as an oxygen source and hydrogen may be supplied to the anode side of FCS 2 from a methanol or gasoline reformer.

Exhaust conduits (not illustrated in FIG. 1) for both the anode and cathode sides of the MEAs 4, 6 are also provided. Additional conduits (AC) 50, 52, 54 are provided for supplying liquid coolant to the SP 8 and CE 14, 16. Appropriate conduits (not illustrated) for exhausting coolant from the SP 8 and CE 14, 16 are also provided.

Although FIG. 1 illustrates a current fuel cell system having PEM fuel cells, the present disclosure may be applied to fuel cell systems utilizing other types of fuel cells such as metal hydride fuel cells, phosphoric acid fuel cells, solid oxide fuel cells, electrogalvanic fuel cells, and alkaline fuel cells.

Figure 2:
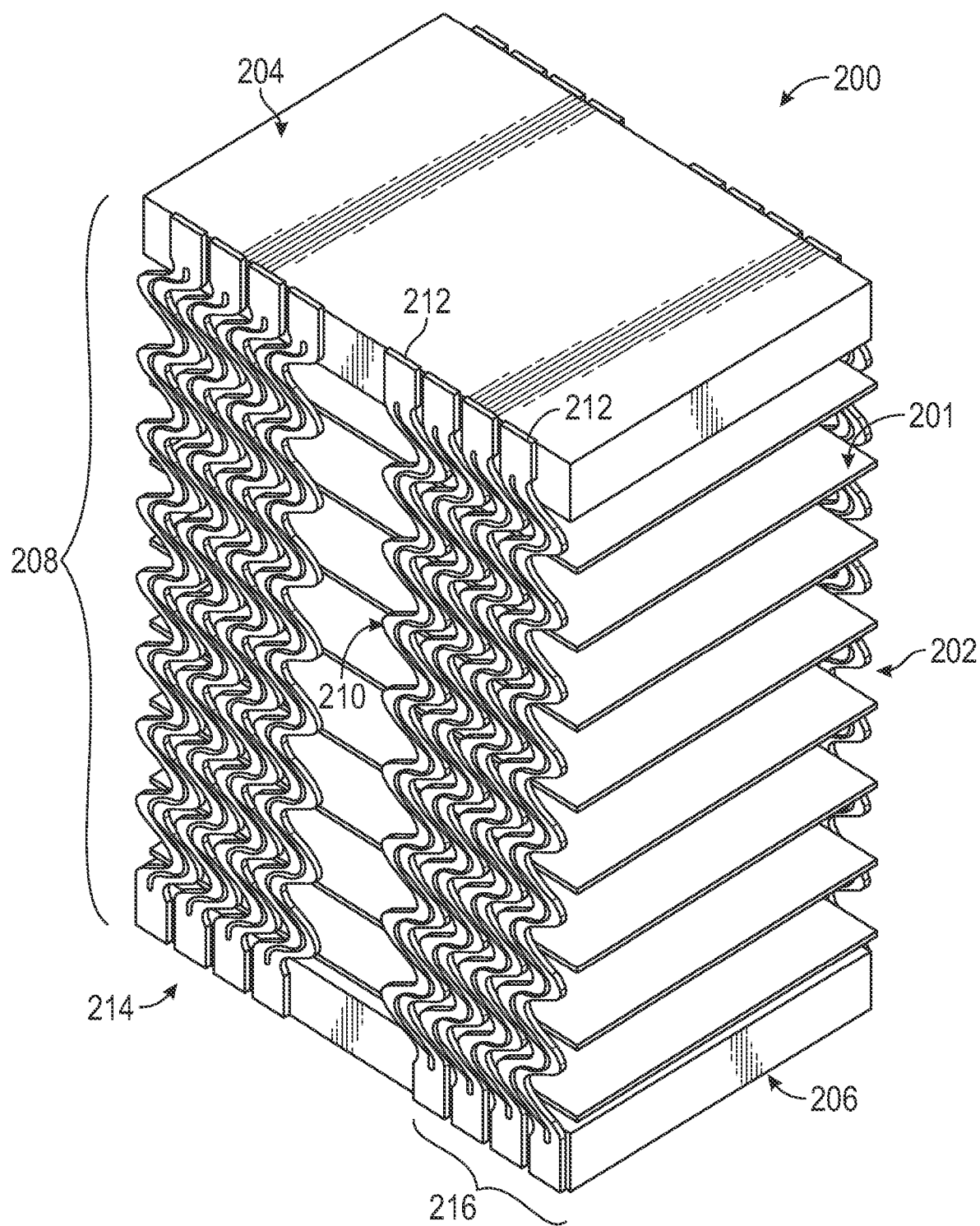
FIG. 2 illustrates a perspective view of a current FCS system utilizing compression retention.

FIG. 2 illustrates a perspective view of a current FCS system utilizing compression retention. As illustrated in FIG. 2, the current fuel cell system 200 includes an FCS 202 between a first end unit (EU) 204 and a second EU 206. The current fuel cell system 200 further includes a compression retention system (CRS) 208 including at least one strip (ST) 210.

Each ST 210 may be located adjacent to the FCS 202 and extends from the first EU 204 to the second EU 206 and may further extend from first 204 and/or second end EU 206 to other locations on the FCS 202. Each ST 210 is connected to the first end unit 204 and the second end unit 206 by fastening means (FM) 212 at opposite ends of the ST 210. Various FM 212 may be used as desired, such as brackets, clamps, clips, adhesive, fastening bolts and nuts, welds, screws, and combinations thereof.

Each ST 210 is located adjacent the FCS 202. The at least one ST 210 may form a partial or complete SP 214 adjacent the FCS 202, with each ST 210 forming the SP 214 inhibiting or mitigating against migration of MEAs 4, 6 in individual fuel cells (IFC) 201 of FCS 202 as the FCS 202 grows and shrinks during operation. The ST 210 adjacent to the FCS 202 may form an interface that moves with the expansion and contraction of the FCS 202, such that the ST 210 may form a sliding interface with the FCS 202.

Each ST 210 may be under tension such that it applies a compressive force to the FCS 202, with the compressive force urging each FC 201 toward an adjacent FC 201 and facilitating electrical contact therebetween. The application of compressive force to the FCS 202 reduces electrical contact resistance between individual FC 201 and improves overall electrical efficiency of the FCS 202.

As illustrated in FIG. 2, the CRS 208 includes multiple ST 210, with at least a portion 216 of each ST 210 nested together. As further illustrated in FIG. 2, the CRS 208 includes sixteen (16) individual ST 210 within each portion 216 and each portion includes four (4) ST 210.

Current FCSs provide improved overall electrical efficiency by utilizing a CRS, such as the CRS 208 of FCS 200 illustrated in FIG. 2. However, operation of the FCSs may induce creep in an active area (AA) and seal of fuel cells that contributes to increased contact resistance and loss of FCS power generation capacity as well as decreased seal force and increased risk of reactant gas and coolant leak. Although utilizing flexible elements, such as springs in the FCS, may address the increased contact resistance and loss of FCS power generation capacity as well as decreased seal force and increased risk of reactant gas and coolant leak, these flexible elements increase the weight and volume of the FCS 200.

The estimated induced creep may be significant, specifically 15 μm per cell for the AA and 27-35 μm per cell for fuel cells that contain generic seals, such as elastomeric seals. This significant creep may contribute to increasing contact resistance and loss of FCS power generation capacity and decreasing seal force and increasing risk of reactant gas and coolant leak.

The present disclosure addresses the increased contact resistance and loss of FCS power generation capacity as well as decreased seal force and increased risk of reactant gas and coolant leak by recovering the power generation capacity, AA pressure and seal force via re-compression. In one embodiment of the present disclosure, a method of FCS re-compression is provided. In another embodiment of the present disclosure, an FCS design is provided to accommodate the FCS re-compression.

Figure 3:
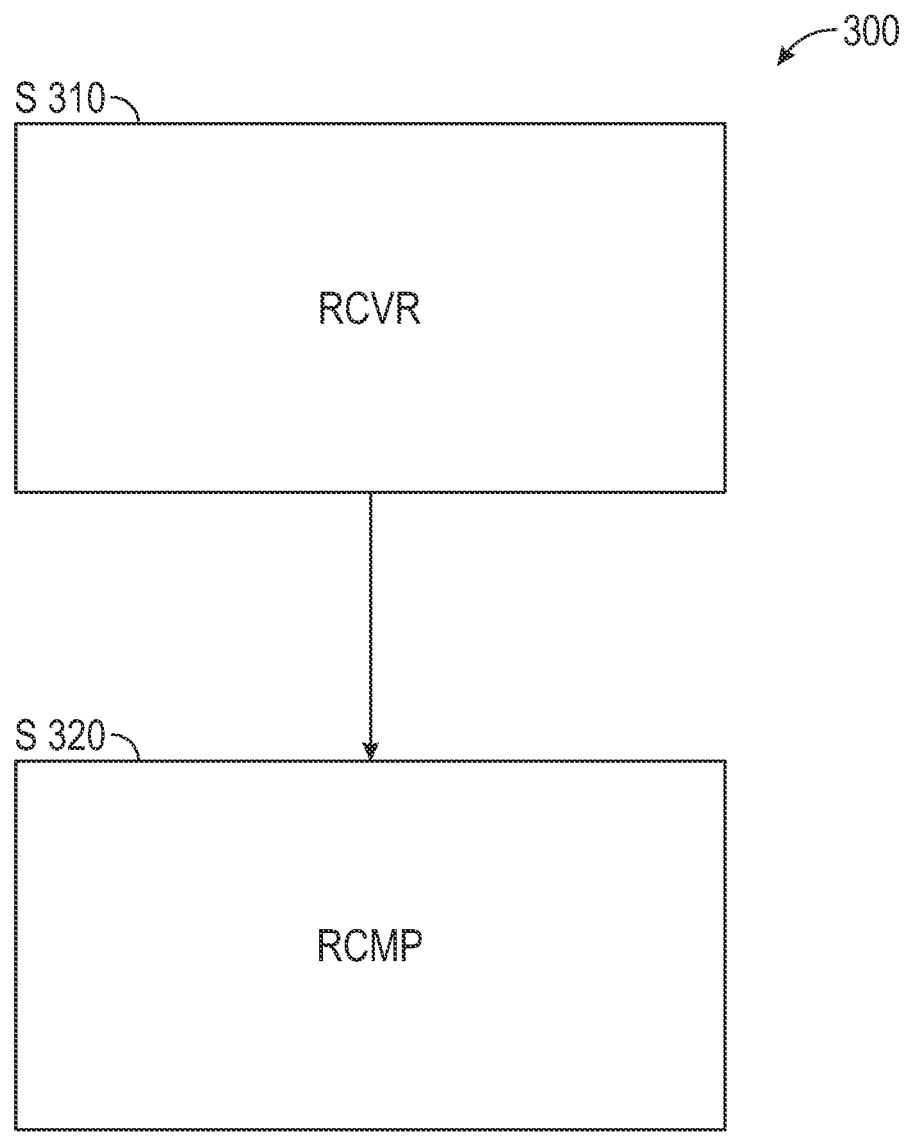
FIG. 3 illustrates a method of FCS re-compression according to an embodiment of the present disclosure.

FIG. 3 illustrates a method (300) of maintaining compressions of a fuel cell system. As illustrated in FIG. 3, the method includes performing recovery (RCVR) of FCSs of the fuel cell system after a pre-determined time of operation (S310) and performing re-compression (RCMP) on each of the recovered FCSs (S320).

The recovery of the FCSs (S310) may be performed as part of a scheduled maintenance routine by an owner of a vehicle in which the fuel cell system is located after a specific period, such as 3000 hours of FCS operation. In one embodiment of the present disclosure, the owner of the vehicle in which the fuel cell system is located may be alerted to an approaching time at which the recovery of the FCSs is performed.

The re-compression of each of the recovered FCSs (S320) may be performed by effecting a predetermined decrease in cell pitch or stack length, such as 0.01 mm per fuel cell. In one embodiment of the present disclosure, the re-compression of each of the recovered FCSs (S320) may be performed via cell repeat control or via increased forces in the FCS, increased forces in the AA of the fuel cells, or increased forces in a seal force of the FCS, or via increased forces in a combination of the FCS, AA, and seal force. In another embodiment of the present invention, the re-compression of each of the recovered FCSs (S320) may be performed without bringing the FCS to a factory that produced the vehicle in which the fuel cell system is located, thereby reducing the cost of the FCS recompression.

Figure 4:
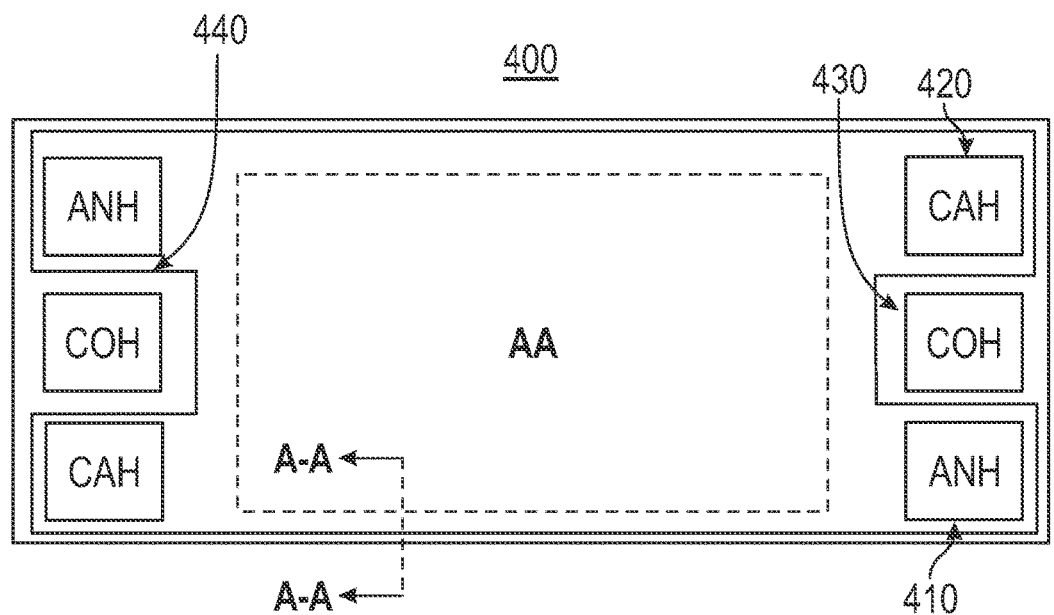
FIG. 4 illustrates a layout of a fuel cell according to an embodiment of the present disclosure.
Figure 5:
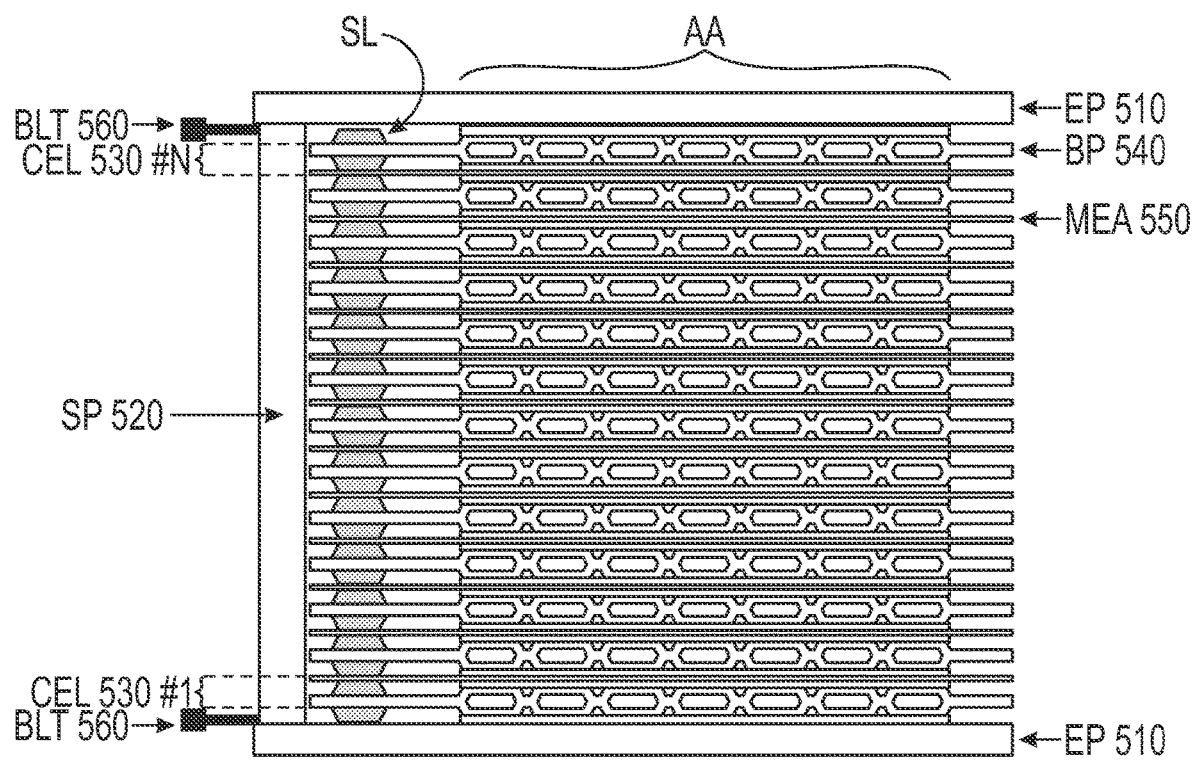
FIG. 5 illustrates a partial cross-section of the fuel cell illustrated in FIG. 4 across the line A-A in FIG. 4 according to an embodiment of the present disclosure.

FIG. 4 illustrates a layout of a fuel cell according to an embodiment of the present disclosure. FIG. 5 illustrates a partial cross-section of the fuel cell illustrated in FIG. 4 across the line A-A in FIG. 4 according to an embodiment of the present disclosure.

As illustrated in FIG. 4, each fuel cell 400 includes multiple anode headers (ANH) 410, multiple cathode headers (CAH) 420 and corresponding coolant headers (COH) 430 around an AA with multiple seal Loops (SL) 440 between the AA and the ANH and COH. In one embodiment of the present disclosure seven SL are provided, specifically two SL for the ANH, two SL for the COH, two SL for the CAH, and one perimeter SL circling the ANH, CAH, and the AA. In an alternate embodiment of the present disclosure, the perimeter SL also circles the two COH.

As illustrated in FIG. 5, each fuel cell 400 is formed of two end plates (EP) 510, a side plate (SP) 520 between the two EP 510 to maintain the stack compression and multiple cells (CEL) 530 between the EP 510, with each of the multiple CEL 530 including a bipolar plate (BP) 540 and an MEA 550. In an alternate embodiment of the present disclosure, tension rods or another entity that provides compression may be used instead of the SP 520.

The present disclosure provides an FCS design to accommodate the FCS re-compression by utilizing features, such as bolts (BLT) 560, to achieve predetermined compression and corresponding bolt holes in the EP 510 of each fuel cell 400 to accommodate the bolts. Specifically, the present disclosure utilizes bolts of a predetermined fixed length that are installed by being driven to a full depth into the bolt holes in the EPs 510 of each fuel cell 400 with caps utilized to cover the bolt holes to prevent contamination before the bolts are installed. In one embodiment of the present disclosure, the predetermined fixed length is selected to match a change in FCS length required for the re-compression. A spacer may be added under the fixed length bolts if variable additional re-compression is desired.

Figure 6:
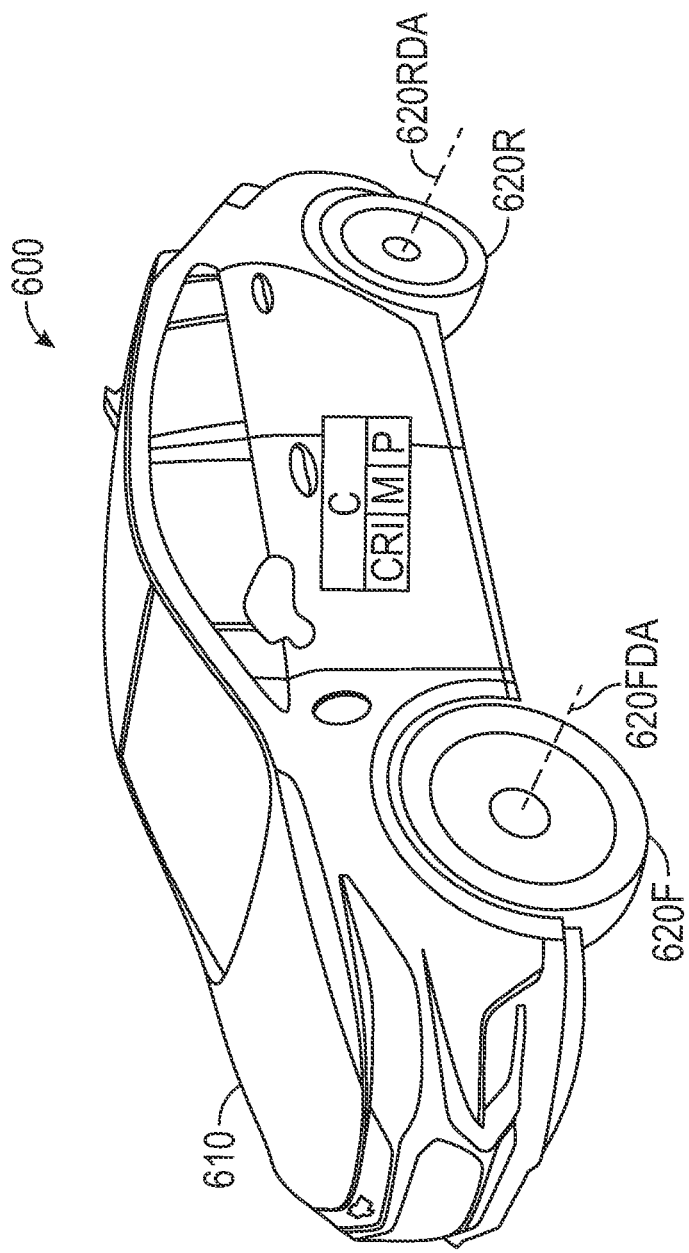
FIG. 6 illustrates a vehicle to which the present disclosure is applicable.

FIG. 6 illustrates a vehicle to which the present disclosure is applicable. As illustrated in FIG. 6, the motor vehicle 600 includes a vehicle body 610, front road wheels 620F, rear road wheels 620R. The vehicle 600 further includes a fuel cell system (not illustrated) including a high-voltage (HV) battery pack, such as one or more lithium-ion battery packs, or packs constructed of another application suitable high-energy battery chemistry. It is noted that the present disclosure is also applicable to a stationary power generator, an airplane, a locomotive, and a ship, as well as other entities that utilize a battery electric system.

The front road wheels 620F rotate about a corresponding front drive axis 620FDA and the rear road wheels 620R rotate about a corresponding rear drive axis 620RDA when stored electrical charge in the battery electric system is discharged or when the fuel cell system generates electricity to power the front road wheels 620F and/or the rear road wheels 620R in different embodiments, depending on the specific drive configuration of the motor vehicle 600.

As further illustrated in FIG. 6, the vehicle 600 may further include computer-readable instructions (CRI) recorded in memory (M) of a control system (C), such as one or more digital computers or electronic control units, and executed by one or more processors (P). The memory (M) may include tangible, non-transitory memory, e.g., read only memory, whether optical, magnetic, flash, or other type. The control system (C) may also include application-sufficient amounts of random-access memory, electrically-erasable programmable read only memory, and similar memory, as well as a high-speed clock, analog-to-digital and digital-to-analog circuitry, and input/output circuitry and devices, as well as appropriate signal conditioning and buffer circuitry. The method and system of the present disclosure may be embodied in the battery electric system.

The present disclosure simultaneously addresses the loss of AA pressure and seal force with the same adjustment in cell repeat by performing re-compression during scheduled maintenance of the vehicle without requiring that the FCSs be brought to a factory facility, thereby reducing the cost of the re-compression process. The present disclosure recovers stack power generation capacity, such as 20-40 mV per cell in an 80 kW FCS, and recovers seal force to increase sealing robustness, such as 0.75 N/mm in an 80 kW FCS. The present disclosure may directly increase the durability of FCSs.

The detailed disclosure and the drawings are supportive and descriptive of the present disclosure, but the scope of the present disclosure is defined solely by the appended claims. While some of the best modes and other embodiments for carrying out the present disclosure have been disclosed in detail, various alternative designs and embodiments exist for practicing the present disclosure as recited in the appended claims. Moreover, the present disclosure expressly includes combinations and sub-combinations of the elements and features disclosed herein.

Aspects of the present disclosure have been presented in general terms and in detail with reference to the illustrated embodiments. Various modifications may be made by those skilled in the art without departing from the scope and spirit of the disclosed embodiments. One skilled in the relevant art will also recognize that the disclosed methods and supporting hardware implementations may be alternatively embodied in other specific forms without departing from the scope of the present disclosure. Therefore, the present disclosure is intended to be illustrative without limiting the inventive scope defined solely by the appended claims.

What is claimed is:

1. A method for maintaining compression of a fuel cell system comprising one or more fuel cells, the method comprising:
   performing recovery of one or more fuel cell stacks (FCSs) of the fuel cell system; and
   performing re-compression of each of the recovered one or more FCSs.

2. The method of claim 1, wherein recovery of one or more FCSs is performed after a specific period.

3. The method of claim 2, wherein the specific period is 3000 hours of operation.

4. The method of claim 1, further comprising alerting an owner of a vehicle in which the one or more FCSs is located to an approaching time at which the recovery of the one or more FCSs is performed.

5. The method of claim 1, wherein performing the re-compression comprises effecting a predetermined decrease in cell pitch or stack length.

6. The method of claim 5, wherein the predetermined decrease is 0.01 mm per fuel cell of each of the one or more FCSs.

7. The method of claim 1, wherein the re-compression is performed via cell repeat control.

8. The method of claim 1, wherein the re-compression is performed via increased forces in at least the one or more FCSs, an active area (AA) of the one or more fuel cells, or a seal force of the one or more FCSs.

9. The method of claim 8, wherein the re-compression is performed via increased forces in at least two of the one or more FCSs, the AA, and the seal force.

10. The method of claim 8, wherein the re-compression is performed via increased forces in the one or more FCSs, an active area (AA) of the one or more fuel cells, and a seal force of the one or more FCSs.

11. The method of claim 1, wherein the re-compression is performed at a location other than a factory that manufactured a vehicle in which the fuel cell system is located.

12. The method of claim 1, wherein each of the one or more fuel cells includes:
    an active area (AA);
    a plurality of anode headers (AH);
    a plurality of cathode headers (CH);
    a plurality of coolant headers around the AA; and
    a plurality of seals (SLs) between the AA and the plurality of AH and CH, wherein:
    each of the one or more fuel cells is formed of two end plates (EPs), a side plate (SP) or tension rod between the two EPs and a plurality cells (CEL) between the EPs, each of the plurality cells comprising a bipolar plate (BP) and a membrane electrode assembly;
    fixed length bolts, each installed by being driven to a full depth into a corresponding bolt hole in the two EPs of each of the one or more fuel cells; and
    a cap covering each of the corresponding bolt holes before the corresponding bolt is installed.

13. The method of claim 12, wherein each of the one or more fuel cells includes a spacer under each of the fixed length bolts.

14. The method of claim 12, wherein the plurality of SLs include seven SLs such that two SLs are provided for two ANH, two SLs are provided for two COH, two SLs are provided for two CAH, and one perimeter SL circles the two ANH, the two CAH and the AA.

15. The method of claim 14, wherein the one perimeter SL also circles the two COH.

16. A method for maintaining compression of a fuel cell system within a motor vehicle comprising one or more fuel cells, the method comprising:
    performing recovery of one or more fuel cell stacks (FCSs) of the fuel cell system within the motor vehicle, wherein the motor vehicle includes a vehicle body, and wheels connected to the vehicle body with the fuel cell system configured to power the wheels, and the fuel cell system comprises:
    the one or more fuel cells, each of the one or more fuel cells comprising:
        an active area (AA);
        a plurality of anode headers (AH);
        a plurality of cathode headers (CH);
        a plurality of coolant headers around the AA; and
        a plurality of seals (SLs) between the AA and the plurality of AH and CH,
    each of the one or more fuel cells is formed of two end plates (EPs), a side plate (SP) or tension rod between the two EPs and a plurality cells (CEL) between the EPs, each of the plurality cells comprising a bipolar plate (BP) and a membrane electrode assembly;
    fixed length bolts, each installed by being driven to a full depth into a corresponding bolt hole in the two EPs of each of the one or more fuel cells; and
    a cap covering each of the corresponding bolt holes before the corresponding bolt is installed; and
    performing re-compression of each of the recovered one or more FCSs.

17. The method of claim 16, wherein the fuel cell system includes a spacer under each of the fixed length bolts.

18. The method of claim 16, wherein the plurality of SLs include seven SLs such that two SLs are provided for two ANH, two SLs are provided for two COH, two SLs are provided for two CAH, and one perimeter SL circles the two ANH, the two CAH and the AA.

19. The method of claim 18, wherein the one perimeter SL also circles the two COH.

20. The method of claim 16, wherein the fuel cell system includes the FCSs formed of the two or more of the fuel cells.

* * * * *